United States Patent
Cai et al.

(10) Patent No.: US 11,507,049 B2
(45) Date of Patent: Nov. 22, 2022

(54) METHOD FOR DETECTING ABNORMITY IN UNSUPERVISED INDUSTRIAL SYSTEM BASED ON DEEP TRANSFER LEARNING

(71) Applicant: GUANGDONG UNIVERSITY OF TECHNOLOGY, Guangdong (CN)

(72) Inventors: Ruichu Cai, Guangdong (CN); Zijian Li, Guangdong (CN); Wen Wen, Guangdong (CN); Zhifeng Hao, Guangdong (CN); Lijuan Wang, Guangdong (CN); Bingfeng Chen, Guangdong (CN); Boyan Xu, Guangdong (CN); Junfeng Li, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 509 days.

(21) Appl. No.: 16/680,530

(22) Filed: Nov. 12, 2019

(65) Prior Publication Data
US 2020/0150622 A1    May 14, 2020

(30) Foreign Application Priority Data
Nov. 13, 2018   (CN) .......................... 201811348701.9

(51) Int. Cl.
*G05B 19/4065* (2006.01)
*G06N 3/08* (2006.01)

(52) U.S. Cl.
CPC ......... *G05B 19/4065* (2013.01); *G06N 3/084* (2013.01); *G06N 3/088* (2013.01)

(58) Field of Classification Search
CPC .... G05B 19/4065; G06N 3/084; G06N 3/088; G06N 3/0454
See application file for complete search history.

(56) References Cited

U.S. PATENT DOCUMENTS

| 2019/0066133 A1* | 2/2019 | Cotton | .................... G06F 17/11 |
| 2021/0027170 A1* | 1/2021 | Ye | .......................... H04L 43/55 |

* cited by examiner

*Primary Examiner* — Manuel A Rivera Vargas
(74) *Attorney, Agent, or Firm* — JCIPRNET

(57) ABSTRACT

The present invention discloses a method for detecting abnormity in an unsupervised industrial system based on deep transfer learning. Labeled machine sensor sequence data from a source domain and unlabeled sensor sequence data from a target domain are used in the present invention to train an industrial system abnormal detection model with good generalization ability, and the industrial system abnormal detection model is trained and tested to finally generate a trained industrial system abnormity discrimination model. Using the model, received machine sensor sequence data can be analyzed and whether a machine is abnormal is discriminated.

19 Claims, 2 Drawing Sheets

METHOD FOR DETECTING ABNORMITY IN UNSUPERVISED INDUSTRIAL SYSTEM BASED ON DEEP TRANSFER LEARNING

CROSS-REFERENCE TO RELATED APPLICATION

This application claims the priority benefit of China application serial no. 201811348701.9, filed on Nov. 13, 2018. The entirety of the above-mentioned patent application is hereby incorporated by reference herein and made a part of this specification.

TECHNICAL FIELD

The present invention relates to the fields of data mining, deep learning, neural network and the like, and more particularly, to a method for detecting abnormity in an unsupervised industrial system based on deep transfer learning.

BACKGROUND

In recent years, with the rapid development of deep learning technology, deep learning has blossomed in all walks of life, and one of its applications in an industrial system is abnormal detection. For example, in a power plant, data of sensors such as temperature and air pressure of a boiler are collected to discriminate whether there is an abnormity by an abnormity discrimination model. In a central air-conditioning system, data of sensors deployed in various parts of the system are collected to discriminate whether there is an abnormity by the abnormity discrimination model. In a telecom marketing system, data of server hardware load and network traffic are collected to discriminate whether there is an abnormality by the abnormity discrimination model. These examples mentioned above all use industrial sensors to receive data, wherein we call labeled data as source domain sensor data and unlabeled data as target domain sensor data.

When data scientists and engineers use a traditional machine learning method to model the industrial system for an abnormal detection problem, they often rely on a large amount of labeled data to estimate and approximate an objective function. As there are not enough data, a trained model is often over-fitted. However, in fact, it is very difficult to acquire these data. First of all, in the abnormal detection problem, the abnormity does not occur frequently, so it takes a long time to collect enough abnormity samples; and however, the data collected from different machines show different performances, such as period, amplitude, etc.. This leads to that the model trained with the data of one machine is not applicable to another machine, and this phenomenon is called data offset in machine learning. Therefore, the use of traditional deep learning technology to solve the abnormal detection problem is greatly limited.

It is considered that although different machine data have different performances, change principles of data are consistent and follow the same physical principle. Taking the boiler of the power plant as an example, as the temperature is increased, the air pressure in the boiler shall be increased; if the boiler leaks water, the air pressure inside the boiler shall be definitely decreased. When the temperature of the boiler is increased and the air pressure of the boiler is not increased obviously, it is very likely that there is an abnormity or even a failure, which is a rule that the model can learn, and this rule is applicable between different machines. Assuming that the data in two fields of a source domain and a target domain are similar, transfer learning is to use a relationship between the source domain data and the target domain data and the rule knowledge learned from the labeled data in the source domain to share to a new model in some way, so that the new model can acquire a good effect in the target data. Transfer learning has always been a difficult problem in the field of deep learning. In recent years, transfer learning has made great progress in computer vision, but there is little work related to transfer learning on time series data, and sensor data collected on the industrial systems are a kind of time series data. Therefore, how to select an appropriate technology to process the time sequence data, how to mine the relationship between the source domain data and the target domain data, how to use the rule of the source domain data to predict whether the target domain machine is abnormal, and how to build a model suitable for abnormity discrimination of multiple machines have certain research significance.

SUMMARY

It is an object of the present invention to provide a method for detecting abnormity in an unsupervised industrial system based on deep transfer learning. According to the present invention, labeled source domain sensor data and unlabeled target domain sensor data in an industrial system are used, so that a model can be trained by relatively few machine data, and the model can be used in all machines.

In order to achieve the object above, a method for detecting abnormity in an unsupervised industrial system based on deep transfer learning according to the present invention comprises the following steps:
1) collecting sensor data;
2) preprocessing the data;
3) dividing data sets;
4) building a model;
5) training the model;
6) testing the model; and
7) discriminating whether a failure occurs, wherein if the failure occurs, a machine is stopped.

The method for detecting abnormity in the unsupervised industrial system based on deep transfer learning according to the present invention has the following advantages and effects: since collection of failure data in the industrial system is difficult, and costs on collecting the failure data are very high, only labeled data of a part of machines can be collected in actual industrial system, while the labeled data of other machines cannot be collected. In a common method for detecting abnormity in a non-transfer industrial system, using a model trained with labeled data only on the machine the labeled data of which cannot be collected has poor performance. Therefore, the common method for detecting abnormity in a non-transfer industrial system cannot be applied to all machines of the industrial system. However, the method for detecting abnormity in the unsupervised industrial system based on deep transfer learning can use less machine data to train the model and can be used in all machines.

DETAILED DESCRIPTION

Figure 1:
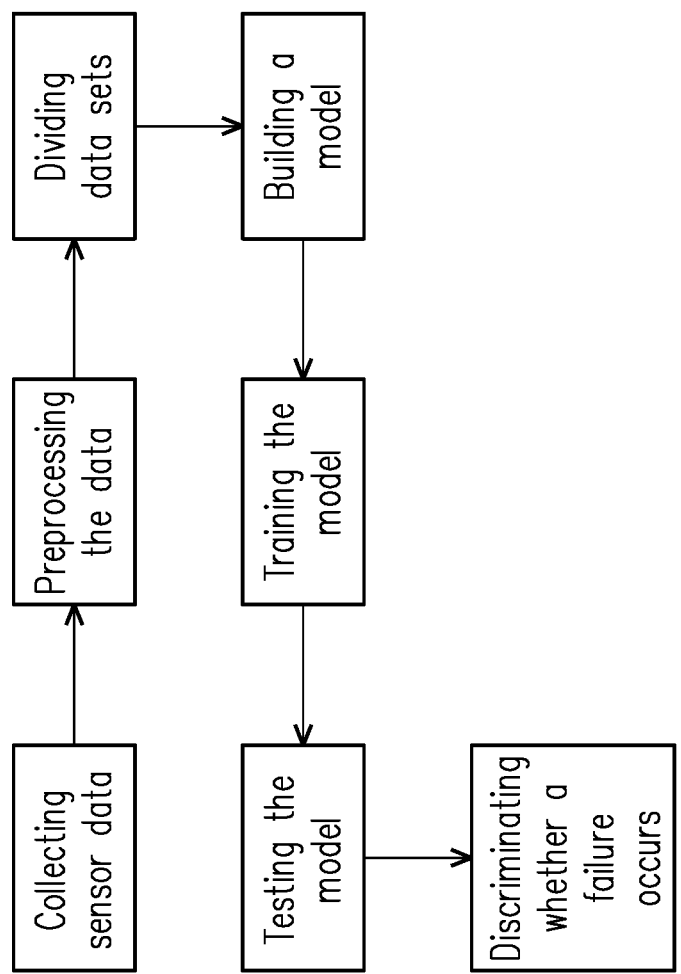
FIG. 1 is a flow chart of a method according to the present invention.

A method for detecting abnormity in an unsupervised industrial system based on deep transfer learning according to the present invention comprises the following steps:
1) Collecting sensor data;
2) Preprocessing the data;
3) Dividing data sets;
4) Building a model;
5) Training the model;
6) Testing the model;
7) Discriminating whether a failure occurs.

When a new machine is added to the industrial system, steps 1) to 6) are repeated to acquire a new model, and then the model is redeployed.

The preprocessing the data in the above-mentioned step 2) divides the sensor data into three types:

a first type is data having a certain range of changes; a second type is data increasing with time; and a third type is data having a fixed state quantity only. Normalization processing is used for the above-mentioned data having a certain range of changes, which is to compress a range of training set data to [0,1]. Differential processing is used for the data increasing with time, which is to data of a previous time step from data of the time step. The data having the fixed state quantity only is not processed, and the preprocessed data is stored into a database finally.

The above-mentioned data having a certain range of changes refers to a temperature and an air pressure; the data increasing with time refers to a water injection rate; and the data having the fixed state quantity only refers to opening and closing of a valve, wherein the opening is recorded as 1, and the closing is recorded as 0.

Collecting source domain sensor sequence data and target domain sensor sequence data in the above-mentioned step 1) is divided into two processes:

11) Dividing machines in an industrial system into two groups: source domain machines and target domain machines;

12) Calling sensor sequence data collected from the source domain machine as the source domain sensor sequence data, calling sensor sequence data collected from the target domain machine as the target domain sensor data, and collecting the sensor data and a record of whether the machine is failed while collecting the data;

13) Wherein, the data of whether the machine is failed is recorded by manual supervision, and other feature data is recorded by a sensor.

The dividing the data sets in the above-mentioned step 3) is divided into two processes:

31) Dividing subsequence data sets;
32) Dividing training data sets and testing data sets;

Wherein the process of dividing the subsequence data sets is as follows:

Acquiring labeled source domain sensor time series data $<X^S, Y^S>$ and labeled target domain sensor sequence data $<X^T, Y^T>$, M and N samples being arranged in a chronological order respectively, and dividing the data into M−T+1 and N−T+1 sequence samples with a length of T. A dividing method is as follows: subsequences $X_m^s, X_{m+1}^s, \ldots, X_{m+T-1}^s$ of an $m^{th}$ sample to an $m+T^{th}$ sample are taken from $X^S$ in the source domain machine sensor data $<X^S, Y^S>$ as a source domain sequence sample $\hat{X}_m^S$, and its corresponding label is $Y_{m+T-1}^S$. For the label $Y_{m+T-1}^S$, if the sample is an abnormal sample, then the sample is labeled as a vector [1,0]; otherwise the sample is labeled as [0,1]. Moreover, different labels $Y_{domain}$ need to be set for a source domain and a target domain, if the sample is a source domain sample, then the sample is labeled as[1,0]; otherwise the sample is labeled as [0,1]. Therefore, a source domain sensor sequence data set $<\hat{X}^S, Y^S, Y_{domain}>$ is acquired. Similarly, a target domain sensor sequence data set $<\hat{X}^T, Y^T, Y_{domain}>$ is acquired.

Wherein the steps of dividing the training data sets and the testing data sets are as follows:

The industrial system machines are divided into two types: source domain machines and target domain machines, all the feature data collection are acquired from the data recorded by sensors in the industrial system machines, and labeled failure data is recorded by manual observation. Then, the source domain sensor sequence data and the target domain sensor sequence data are respectively divided into a training set and a testing set, and four types of data comprising source domain training set data, source domain testing set data, target domain training set data and target domain testing set data exist finally. The source domain training set data and the source domain testing set data are called the source domain data; the target domain training set data and the target domain testing set data are called the target domain data; the source domain training set data and the target domain training set data are called the training set data; and the source domain testing set data and the target domain testing set data are called the testing set data. Wherein, the training set and the testing set are divided according to a time sequence, the earlier 80% of the data in the time sequence serves as the training set, while the later 20% of the data in the time sequence serves as the testing set, wherein the labels in the training set of the target domain are removed, and finally, the training data set and the testing data set of the source domain sensor sequence data set are respectively $<\hat{X}^S, Y_S, Y_{domain}>_{train}$ and $<\hat{X}^S, Y^S, Y_{domain}>_{test}$, and the training data set and testing data set of the target domain are respectively $\hat{X}^T, Y_{domain}>_{train}$ and $<\hat{X}^T, Y^T, Y_{domain}>_{test}$.

The model according to the building the model in the above-mentioned step 4) is divided into five components: a source domain feature extraction layer, a target domain feature extraction layer, a time sequence information extraction layer based on long and short time memory units, an abnormity discriminator and a domain discriminator, and a method for building the model is as follows:

41) firstly, dividing the data into source domain data and target domain data according to collected machines, inputting the source domain data into the source domain feature extraction layer, and inputting the target domain data into the target domain feature extraction layer;

42) using an output of the source domain feature extraction layer as an input of the time sequence information extraction layer based on long and short time memory units, wherein the time sequence information extraction layer based on long and short time memory units (implemented by software) has two outputs, one output is a hidden state output, which is used as an input of a failure discriminator, the failure discriminator is composed of a multilayer perceptron and a softmax layer, and is used for discriminating whether an industrial system corresponding to the data inputted is failed; and the other output is a cell state output, which is used as an input of the domain discriminator, the domain discriminator is also composed of a multilayer perceptron and a softmax layer, and is used for discriminating whether the data inputted is the source domain sensor sequence data or the target domain sensor sequence data.

The training the model in the above-mentioned step 5) comprises the following steps:

51) Respectively taking out a batch of data from the source domain training set and the target domain training set, a batch size of which being both b, inputting data with a batch size of b, outputting, by the abnormity discriminator, b predicted values $y_{label\_pre}$, and outputting, by the domain discriminator, b predicted values $y_{domain\_pre}$, wherein the abnormity discriminator is composed of the multilayer perceptron and the softmax layer, and outputs a $y_{label\_pre}$ for one sample input. The domain discriminator is composed of the multilayer perceptron and the softmax layer, and outputs a $y_{domain\_pre}$ for one sample input, wherein $y_{label\_pre}$ and $y_{domain\_pre}$ are both two-dimensional vectors; and then calculating a loss value of the abnormity discriminator and a loss value of the domain discriminator according to actual results, wherein calculation methods for an abnormity predictor and a domain predictor are as follows:

$$loss_{lable} = \frac{1}{b}\sum_{i=1}^{n=2}(y^i_{true\_label}\ln y^i_{label\_pre})$$

$$loss_{domain} = \frac{1}{b}\sum_{i=1}^{n=2}(y^i_{true\_domain}\ln y^i_{domain\_pre})$$

A final total loss function is:

$$total\_loss = loss_{label} + \lambda \cdot loss_{domain}$$

Wherein, $\lambda$ is a hyper-parameter for adjustment, and is set as 0.005 by default; and 52) After calculating the total loss value, calculating a gradient and using the gradient to update model parameters by back propagation algorithm; and Repeating the steps 51 to 52) until the model is converged, wherein a convergence standard is that the total loss value of the model is basically unchanged. Since the total_loss is decreased continuously with the training of the model, a model convergence condition is that the total_loss is not decreased any more.

The testing the model in the above-mentioned step 6) comprises the following steps:

Inputting both the source domain testing sets and the target domain testing sets into the model during testing, the output of the abnormity discriminator being a prediction result, and then comparing with an actual abnormity of a machine, i.e., a correct label, to calculate an accuracy rate. For example, two samples are inputted, feature values of the samples are respectively [1,2,3] and [4,5,6], and are respectively outputted as 0 and 1, wherein 0 represents that the failure does not exist, and 1 represents that the failure exists. This set of samples are labelled as 1 and 1. Therefore, one sample is predicted to be correct and passes the test, and the other sample is incorrect and fails the test. Then:

Correct rate of test=number of samples predicted to be correct/total samples

That is, ½=0.5.

In the discriminating whether the failure occurs in the above-mentioned step 7), the sensor sequence data collected by all the machines in the industrial system is inputted into the model, if the failure discriminator of the model discriminates that the failure occurs, the machine is stopped for maintenance.

When the new machine is added to the industrial system, steps 1) to 6) are repeated to acquire the new model, and then the model is redeployed. The method for updating the model is as follows:

The data are recollected and the model is trained, the trained model is redeployed to a model module of the abnormal detection system for real-time discrimination of the abnormity of the machine (the trained model is the model with the highest correct rate of test); and when the new machine appears in the industrial system, the new machine can be used as the target domain machine, and the sensor data of the new machine are recollected for training and updating the model, that is, only the sensor data are collected, but no failure data is recorded manually. Since the acquired model is a document, the updating method is to replace the document directly. When the new machine is added to the industrial system (for example, when a production scale is expanded, the new machine can be added to the industrial system, such as a new boiler added to a power plant), the new machine shall be used as the target domain machine to collect data, and the model is retrained.

According to the present invention, a transfer learning model is built and trained using a transfer learning idea, after the model passes a test of a testing set sample, the model outputs whether the machine is failed by inputting the sensor data collected from the sensor of the industrial system into the model. According to the present invention, the source domain feature extraction layer and the target domain feature extraction layer composed of a fully-connected network are added before extracting the long and short time memory units of the sequence information, the source domain feature extraction layer is specially used for extracting source domain data features, and the target domain feature extraction layer is specially used for extracting target domain data features; and the features are inputted into the domain discriminator by using unit states in the long and short time memory units.

In order to facilitate those skilled in the art to better understand the technical solutions of the present invention, taking boiler data of a power plant as an example, the method of the present invention is further described in detail with reference to FIG. 1 and detailed embodiments, which is specifically as follows:

Step 1: Collecting the sensor data, firstly, collecting the data from sensors of power plant boilers, two different boilers are selected to collect data, and each of the boilers has 20 sensors.

Step 2: Preprocessing the data, and different preprocessing methods are used for different sensor data, which are shown in following table:

| Name of the sensor data | Preprocessing method |
| --- | --- |
| Steam pressure of main collecting pipe | Normalization processing |
| Outdoor temperature | Normalization processing |
| Boiler water temperature | Normalization processing |
| Water inlet time | Differential processing |
| Abandon temperature | Normalization processing |
| Water injection rate | Differential processing |
| Water injection temperature | Normalization processing |
| Pipe wall temperature | Normalization processing |
| Damping angle | Normalization processing |
| Temperature scale | Normalization processing |
| External temperature | Normalization processing |
| Operation state | No processing |
| Operation code | No processing |
| Input code | No processing |
| Energy consumption | Differential processing |
| Steam pressure | Normalization processing |
| Chemical injection rate | Differential processing |
| Burning time | Differential processing |
| Ignition times | Differential processing |
| Gas consumption | Normalization processing |

Since different sensor data have different processing methods, then three types of the sensor data (the steam pressure of main collecting pipe, the water injection rate and the operation state) are selected to generate five sample (each sample is two time steps) data as preprocessing demonstration examples: data of unprocessed source domain are as follows:

| No. | Steam pressure of main collecting pipe | Water injection rate | Operation state | Normal or abnormal |
|---|---|---|---|---|
| 1 | 0.6704 | 0.8542 | 1 | Normal |
|   | 0.6818 | 0.8543 | 1 | Normal |
|   | 0.6931 | 0.8544 | 1 | Normal |
|   | 0.6818 | 0.8544 | 0 | Abnormal |
|   | 0.7272 | 0.8544 | 0 | Normal |
|   | 0.6818 | 0.8545 | 1 | Normal |
|   | 0.6818 | 0.8545 | 1 | Normal |

Firstly, the sensor data of the steam pressure of the main collecting pipe is normalized, and the calculation formula is as follows:

$$y = \frac{x - MinValue}{MaxValue - MinValue}.$$

By observing the data, a maximum value and a minimum value in the data of the steam pressure of the main collecting pipe are 0.7272 and 0.6704 respectively, and then, when a value of the steam pressure of the main collecting pipe is 0.6818, x is substituted into the formula to acquire a normalization result equal to about 0.2007.

Regarding to the sensor data of the water injection rate, the data is preprocessed by the differential method, that is, a value of a current time step is subtracted from a next time step. For example, a first time step is subtracted from a second time step to acquire a result 0.8543-0.8542=0.0001, which is a value of the first time step after preprocessing, and after differential processing, the total data set can lose one sample.

The sensor data of the operation state is not modified. The preprocessed data are as follows:

| No. | Steam pressure of main collecting pipe | Water injection rate | Operation state | Normal or abnormal |
|---|---|---|---|---|
| 1 | 0.2007 | 0.0001 | 1 | [0,1] |
|   | 0.3996 | 0.0001 | 1 | [0,1] |
|   | 0.2007 | 0 | 0 | [1,0] |
|   | 1.0 | 0 | 0 | [0,1] |
|   | 0.2007 | 0.0001 | 1 | [0,1] |
|   | 0.2007 | 0 | 1 | [0,1] |

Step 3: Dividing the data sets, which is divided into two processes of: dividing subsequences and dividing training sets and testing sets.

Firstly, the subsequences are divided, a subsequence length is 2, if the preprocessed data set has six samples, then five subsequence samples can be divided, the subsequence length being 2 refers to the subsequence length of each sample after processing, for example, the following table has five samples with sample numbers of a, b, c, d and e respectively; taking the sample a as an example, the sample a is a subsequence composed of two data with data numbers of 1 and 2, so that the length is 2, and the same is for data b, c, d and e.

If the preprocessed data set has four samples, three subsequence samples can be divided:

| Sample number | Data number | Normal or abnormal (label) |
|---|---|---|
| a | 1, 2 | [0, 1] |
| b | 2, 3 | [1, 0] |
| c | 3, 4 | [0, 1] |
| d | 4, 5 | [0, 1] |
| e | 5, 6 | [0, 1] |

The earlier 80% of the data serves as the training set, while the later 20% of the data serves as the testing set, then the results of the training set and testing set are as follows:

| Sample number | formal or abnormal (label) |
|---|---|
| Training set | |
| a | [0, 1] |
| b | [1, 0] |
| c | [0, 1] |
| d | [0, 1] |
| Testing set | |
| e | [0, 1] |

The processing process of the target domain sensor sequence data is the same as that of the source domain sensor sequence data.

Figure 2:
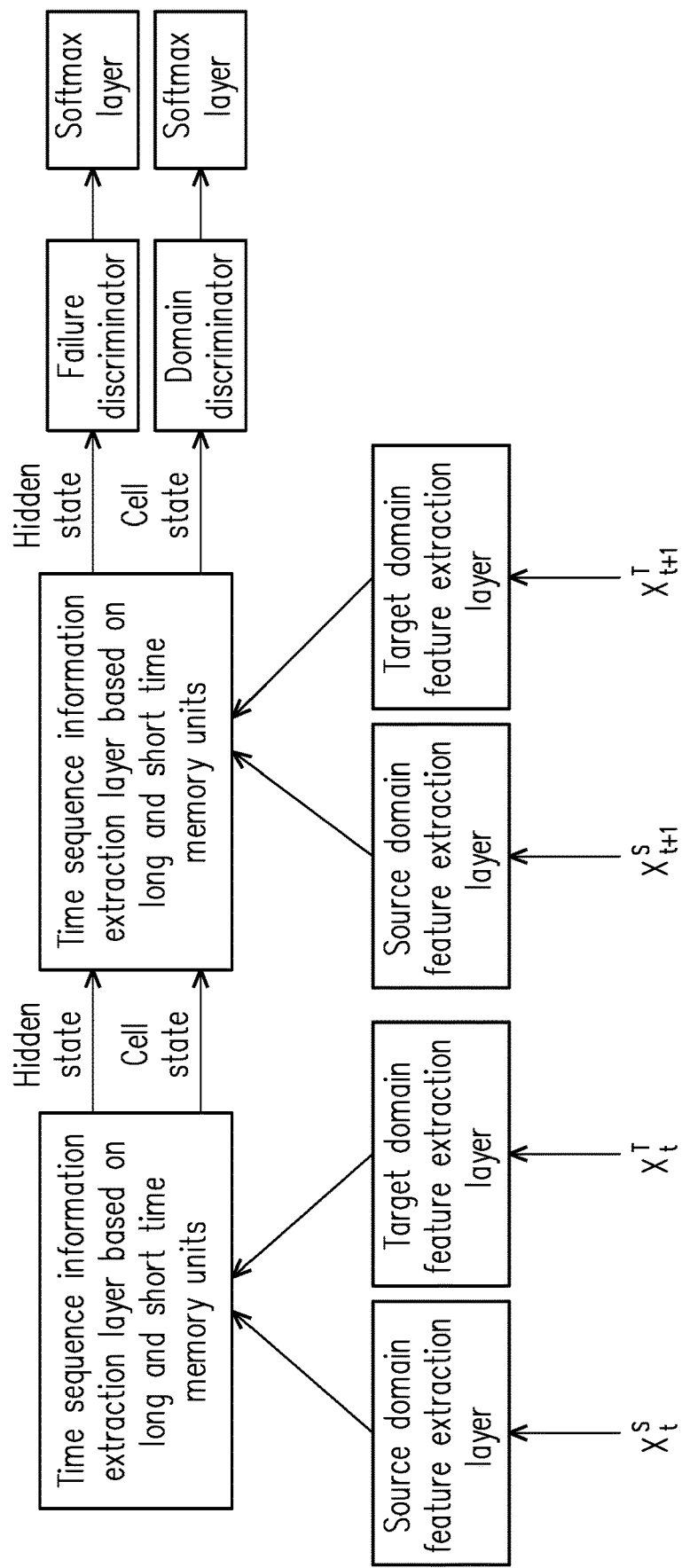
FIG. 2 is a building principle diagram of a model according to the present invention.

Step 4: Building the model. The model has five components in total: the source domain feature extraction layer, the target domain feature extraction layer, the time sequence information extraction layer based on long and short time memory units, the abnormity discriminator and the domain discriminator, which are specifically shown in FIG. 2.

Wherein, each of the source domain feature extraction layer and the target domain feature extraction layer is realized by one layer of 100-dimensional fully-connected neural network. The time sequence information extraction layer based on long and short time memory units is realized by one layer of 150-dimensional long and short time memory unit neural network. The abnormity discriminator and the domain discriminator are respectively realized by two layers of fully-connected neural networks, the first layer is 20-dimensional and the second layer is 2-dimensional.

Step 5: Training the model, and the training process is divided into the following steps.

A. Disrupting the source domain training set and the target domain training set.

B. A batch of data are respectively taken out from the source domain training set and the target domain training set, the batch size of which is both b, and the value of the batch size b is 128 in the present invention, which is inputted into the model. The trained model is set to use a training mode and a transfer mode during training. A batch of data are inputted, the predicted value $y_{label\_pre}$ is outputted by the abnormity discriminator, and the predicted value $y_{domain\_pre}$ is outputted by the domain discriminator, wherein $y_{label\_pre}$ and $y_{domain\_pre}$ are both b×2 tensors. Then, the loss value of the abnormity discriminator and the loss value of the domain discriminator are calculated according to actual results. Calculation methods for the abnormity predictor and the domain predictor are as follows:

i. $loss_{lable} = \frac{1}{b}\sum_{i=1}^{n=2}(y^i_{true\_label}\ln y^i_{label\_pre})$ ii. $loss_{domain} = \frac{1}{b}\sum_{i=1}^{n=2}(y^i_{true\_domain}\ln y^i_{domain\_pre})$ The final total loss function is:

$$total\_loss = loss_{label} + \lambda \cdot loss_{domain}$$

Wherein, λ is the hyper-parameter for adjustment, and is set as 0.005 in the present invention.

C. After calculating the total loss value, calculating the gradient and using the gradient to update model parameters by back propagation algorithm.

D. Repeating B to C until the model is converged, wherein the convergence standard is that the total loss value of the model is basically unchanged.

The training process of the model can be realized by the following program.

---

Input: the source domain training set $<\hat{X}^S, Y^S, Y_{domain}>_{train}$ and the target domain training set
$<\hat{X}^T, Y_{domain}>_{train}$, and learning rate η
Output: the trained model
For number of training iterations do $$loss_{lable} = \frac{1}{b}\sum_{i=1}^{n=2}(y'_{true\_label}\ln y'_{label\_pre})$$

$$loss_{domain} = \frac{1}{b}\sum_{i=1}^{n=2}(y'_{true\_domain}\ln y'_{domain\_pre})$$

total_loss = $loss_{label} + \lambda \cdot loss_{domain}$
Update model parameters θ

$$\theta \leftarrow \theta - \eta\frac{\partial total\_loss}{\partial \theta}$$

---

Step 6: Testing the model. The training mode and the transfer mode are no longer used to input all target domain testing sets into the model during testing to acquire a prediction result, then the prediction result is compared with the labeling result to calculate the accuracy rate, and the accuracy rate calculated by the present invention is 98%.

Step 7: Discriminating whether the failure occurs, the sensor sequence data are collected in real time in the industrial system, the collected sensor data are inputted into the model, if the model discriminates that the failure occurs, the machine is stopped timely for maintenance, and if the machine is not damaged, no processing is performed.

What is claimed is:

1. A method for detecting abnoi iity in an unsupervised industrial system based on deep transfer learning, comprising the following steps:
   1) collecting sensor data by a processor;
   2) preprocessing the data by the processor;
   3) dividing data sets by the processor;
   4) building a model by the processor;
   5) training the model by the processor;
   6) testing the model by the processor; and
   7) discriminating whether a failure occurs by the processor,
   wherein the collecting sensor data in said step 1) comprises:
   collecting source domain sensor sequence data and target domain sensor sequence data,
   wherein the collecting the source domain sensor sequence data and the target domain sensor sequence data in said step 1) is divided into two processes:
   11) dividing machines in an industrial system into two groups: source domain machines and target domain machines; and
   12) calling sensor sequence data collected from the source domain machines as the source domain sensor sequence data, calling sensor sequence data collected from the target domain machines as the target domain sensor data, and collecting the sensor data and a record of whether a part of the machines is failed while collecting the data;
   13) wherein, the data of whether the part of the machines is failed is recorded by manual supervision, and other feature data is recorded by a plurality of sensors.

2. The method for detecting abnormity in the unsupervised industrial system based on deep transfer learning according to claim 1, wherein the preprocessing the data in said step 2) divides the sensor data into three types; a first type is data having a certain range of changes; a second type is data increasing with time; and a third type is data having a fixed state quantity only;
   normalization processing is used for the data having the certain range of changes, which is to compress a range of training set data to [0,1]; differential processing is used for the data increasing with time, which is to subtract data of a previous time step from data of the time step; and the data having the fixed state quantity only is not processed, and the preprocessed data is stored into a database finally.

3. The method for detecting abnormity in the unsupervised industrial system based on deep transfer learning according to claim 2, wherein the data having the certain range of changes refers to a temperature and an air pressure; the data increasing with time refers to a water injection rate; and the data having the fixed state quantity only refers to opening and closing of a valve, wherein the opening is recorded as 1, and the closing is recorded as 0.

4. The method for detecting abnormity in the unsupervised industrial system based on deep transfer learning according to claim 3, wherein in the discriminating whether the failure occurs in said step 7), the sensor sequence data collected by all machines in the industrial system is inputted into the model; if a failure discriminator of the model discriminates that the failure occurs, the machine is stopped for maintenance.

5. The method for detecting abnormity in the unsupervised industrial system based on deep transfer learning according to claim 2, wherein in the discriminating whether the failure occurs in said step 7), the sensor sequence data collected by all machines in the industrial system is inputted into the model; if a failure discriminator of the model discriminates that the failure occurs, the machine is stopped for maintenance.

6. The method for detecting abnormity in the unsupervised industrial system based on deep transfer learning according to claim 5, wherein a transfer learning model is built and trained using a transfer learning idea, after the model passes a test of a testing set sample, the model outputs whether the machine is failed by inputting the sensor data collected from the sensor of the industrial system into the model.

7. The method for detecting abnormity in the unsupervised industrial system based on deep transfer learning according to claim 1, wherein the dividing the data sets in said step 3) is divided into two processes:

31) dividing subsequence data sets; and 32) dividing training data sets and testing data sets;

wherein the process of dividing the subsequence data sets is as follows:

acquiring labeled source domain sensor sequence data $<X^S, Y^S>$ and labeled target domain sensor sequence data $<X^T, Y^T>$, M and N samples being arranged in a chronological order respectively, and dividing the data into M−T+1 and N−T+1 sequence samples with a length of T, wherein a dividing method is as follows: subsequences $X_m^S$, $X_{m+1}^S$, $X_{m+2}^S$, and $X_{m+T-1}^S$ of an $m^{th}$ sample to an $m+7^{th}$ sample are taken from $X^S$ in the source domain machine sensor data $<X^S, Y^S>$ as a source domain sequence sample $\hat{X}_m^S$, and its corresponding label is $Y_{m+T-1}^S$: for the label $Y_{m+T}^S$, if the sample is an abnormal sample, then the sample is labeled as a vector [1,0]; otherwise the sample is labeled as [0,1]; moreover, different labels $Y_{domain}$ need to be set for a source domain and a target domain, if the sample is a source domain sample, then the sample is labeled as [1,0]; otherwise the sample is labeled as [0,1], thus a source domain sensor sequence data set $<\hat{X}^S, Y^S, Y_{domain}>$ is acquired, similarly, a target domain sensor sequence data set $<\hat{X}^T, Y^T, Y_{domain}>$ is acquired;

wherein the steps of dividing the training data sets and the testing data sets are as follows:

industrial system machines are divided into two types: source domain machines and target domain machines, all feature data collection are acquired from data recorded by sensors in the industrial system machines, and labeled failure data is recorded by manual observation, then the source domain sensor sequence data and the target domain sensor sequence data are respectively divided into a training set and a testing set, and four types of data comprising source domain training set data, source domain testing set data, target domain training set data and target domain testing set data exist finally; the source domain training set data and the source domain testing set data are called the source domain data; the target domain training set data and the target domain testing set data are called the target domain data; the source domain training set data and the target domain training set data are called the training set data; and the source domain testing set data and the target domain testing set data are called the testing set data, wherein the training set and the testing set are divided according to a time sequence, the earlier 80% of the data in the time sequence serves as the training set, while the later 20% of the data in the time sequence serves as the testing set, wherein labels in the training set of the target domain are removed, and finally, the training data set and the testing data set of the source domain sensor sequence data set are respectively $<\hat{X}^s, Y^S, Y_{domain}>_{train}$ and $<\hat{X}^s, Y^S, Y_{domain}>_{test}$, and the training data set and the testing data set of the target domain are respectively $<\hat{X}^T, Y_{domain}>_{train}$ and $<\hat{X}^T, Y^T, Y_{domain}>_{test}$.

8. The method for detecting abnormity in the unsupervised industrial system based on deep transfer learning according to claim 7, wherein in the discriminating whether the failure occurs in said step 7), the sensor sequence data collected by all machines in the industrial system is inputted into the model; if a failure discriminator of the model discriminates that the failure occurs, the machine is stopped for maintenance.

9. The method for detecting abnormity in an unsupervised industrial system based on deep transfer learning according to claim 1, wherein the model according to the building the model in said step 4) is divided into five components: a source domain feature extraction layer, a target domain feature extraction layer, a time sequence information extraction layer based on long and short time memory units, an abnormity discriminator and a domain discriminator, and a method for building the model is as follows:

41) firstly, dividing the data into source domain data and target domain data according to collected machines, inputting the source domain data into the source domain feature extraction layer, and inputting the target domain data into the target domain feature extraction layer; and 42) using an output of the source domain feature extraction layer as an input of the time sequence information extraction layer based on long and short time memory units, wherein the time sequence information extraction layer based on the long and short time memory units (implemented by software) has two outputs, the one output is a hidden state output, which is used as an input of a failure discriminator, the failure discriminator is composed of a multilayer perceptron and a softmax layer, and is used for discriminating whether an industrial system corresponding to the data inputted is failed; and the other output is a cell state output, which is used as an input of the domain discriminator, the domain discriminator is also composed of a multilayer perceptron and a softmax layer, and is used for discriminating whether the data inputted is a source domain sensor sequence data or a target domain sensor sequence data.

10. The method for detecting abnormity in the unsupervised industrial system based on deep transfer learning according to claim 9, wherein in the discriminating whether the failure occurs in said step 7), the sensor sequence data collected by all machines in the industrial system is inputted into the model; if a failure discriminator of the model discriminates that the failure occurs, the machine is stopped for maintenance.

11. The method for detecting abnormity in the unsupervised industrial system based on deep transfer learning according to claim 1, wherein the training the model in said step 5) comprises the following steps:

51) respectively taking out a batch of data from a source domain training set and a target domain training set, a batch size of which being both b, inputting data with the batch size of b, outputting, by an abnormity discriminator, b predicted values $y_{label\_pre}$, and outputting, by a domain discriminator, b predicted values $y_{domain\_pre}$, wherein the abnormity discriminator is composed of a multilayer perceptron and a softmax layer, and outputs a $y_{label\_pre}$ for one sample input; the domain discriminator is composed of a multilayer perceptron and a softmax layer, and outputs a $y_{domain\_pre}$ for one sample input, wherein $y_{label\_pre}$ and $y_{domain\_pre}$ are both two-dimensional vectors; and then calculating a loss value of the abnormity discriminator and a loss value of the domain discriminator according to actual results, wherein calculation methods for an abnormity predictor and a domain predictor are as follows:

$$loss_{lable} = \frac{1}{b}\sum_{i=1}^{n=2}(y^i_{true\_label}\ln y^i_{label\_pre})$$

-continued $$loss_{domain} = \frac{1}{b}\sum_{i=1}^{n=2}(y^i_{true\_domain}\ln y^i_{domain\_pre})$$

a final total loss function is:

total_loss=loss$_{label}$+λ·loss$_{domain}$ wherein, λ is a hyper-parameter for adjustment, and is set as 0.005 by default; and 52) after calculating a total loss value, calculating a gradient and using the gradient to update model parameters by back propagation algorithm; and repeating the steps 51 to 52) until the model is converged, wherein a convergence standard is that the total loss value of the model is basically unchanged; since a total_loss is decreased continuously with the training of the model, a model convergence condition is that the total_loss is not decreased any more.

12. The method for detecting abnormity in the unsupervised industrial system based on deep transfer learning according to claim 11, wherein in the discriminating whether the failure occurs in said step 7), the sensor sequence data collected by all machines in the industrial system is inputted into the model; if a failure discriminator of the model discriminates that the failure occurs, the machine is stopped for maintenance.

13. The method for detecting abnormity in the unsupervised industrial system based on deep transfer learning according to claim 1, wherein the testing the model in said step 6) comprises the following steps:
inputting both source domain testing sets and target domain testing sets into the model during testing, an output of an abnormity discriminator being a prediction result, and then comparing with an actual abnormity of a machine, i.e., a correct label, to calculate an accuracy rate.

14. The method for detecting abnormity in the unsupervised industrial system based on deep transfer learning according to claim 13, wherein in the discriminating whether the failure occurs in said step 7), the sensor sequence data collected by all machines in the industrial system is inputted into the model; if a failure discriminator of the model discriminates that the failure occurs, the machine is stopped for maintenance.

15. The method for detecting abnormity in the unsupervised industrial system based on deep transfer learning according to claim 14, wherein a transfer learning model is built and trained using a transfer learning idea, after the model passes a test of a testing set sample, the model outputs whether the machine is failed by inputting the sensor data collected from the sensor of the industrial system into the model.

16. The method for detecting abnormity in the unsupervised industrial system based on deep transfer learning according to claim 1, wherein in the discriminating whether the failure occurs in said step 7), the sensor sequence data collected by all machines in the industrial system is inputted into the model; if a failure discriminator of the model discriminates that the failure occurs, the machine is stopped for maintenance.

17. The method for detecting abnormity in the unsupervised industrial system based on deep transfer learning according to claim 16, wherein a transfer learning model is built and trained using a transfer learning idea, after the model passes a test of a testing set sample, the model outputs whether the machine is failed by inputting the sensor data collected from the sensor of the industrial system into the model.

18. The method for detecting abnormity in the unsupervised industrial system based on deep transfer learning according to claim 17, wherein a source domain feature extraction layer and a target domain feature extraction layer composed of a fully-connected network are added before extracting long and short time memory units of the sequence information, the source domain feature extraction layer is specially used for extracting source domain data features, and the target domain feature extraction layer is specially used for extracting target domain data features; and the features are inputted into a domain discriminator by using unit states in the long and short time memory units.

19. The method for detecting abnormity in the unsupervised industrial system based on deep transfer learning according to claim 1, wherein in the discriminating whether the failure occurs in said step 7), the sensor sequence data collected by all machines in the industrial system is inputted into the model; if a failure discriminator of the model discriminates that the failure occurs, the machine is stopped for maintenance.

\* \* \* \* \*